United States Patent
Fisher et al.

(10) Patent No.: US 11,993,009 B2
(45) Date of Patent: May 28, 2024

(54) COMPOSITIONS FOR ADDITIVE MANUFACTURING AND METHODS OF ADDITIVE MANUFACTURING, PARTICULARLY OF NUCLEAR REACTOR COMPONENTS

(71) Applicant: BWXT Advanced Technologies LLC, Lynchburg, VA (US)

(72) Inventors: Benjamin D. Fisher, Lynchburg, VA (US); John R. Salasin, Lynchburg, VA (US); Bryan Blake Wiggins, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 745 days.

(21) Appl. No.: 16/835,370

(22) Filed: Mar. 31, 2020

(65) Prior Publication Data
US 2020/0353681 A1   Nov. 12, 2020

Related U.S. Application Data

(60) Provisional application No. 62/827,670, filed on Apr. 1, 2019.

(51) Int. Cl.
*B29C 64/165* (2017.01)
*B33Y 10/00* (2015.01)
(Continued)

(52) U.S. Cl.
CPC ............ *B29C 64/165* (2017.08); *B33Y 10/00* (2014.12); *B33Y 70/10* (2020.01); *B33Y 80/00* (2014.12);
(Continued)

(58) Field of Classification Search
CPC .......... B29C 64/165; B29C 64/00–194; B33Y 70/10; C08F 2/46; C08F 2/48; C08F 2/50;
(Continued)

(56) References Cited

U.S. PATENT DOCUMENTS 3,849,329 A * 11/1974 Cahoon, Jr. ............... G21C 3/64
                                                        264/0.5
6,117,612 A    9/2000 Halloran et al.
(Continued)

FOREIGN PATENT DOCUMENTS

EP    3287213 A1    2/2018
GB    1502597 A *   3/1978 ................ C08F 2/46
(Continued)

OTHER PUBLICATIONS

Scifinder Properties of CAS 162881-26-7 (2023).*
(Continued)

*Primary Examiner* — Kregg T Brooks
(74) *Attorney, Agent, or Firm* — Morgan, Lewis & Bockius LLP

(57) ABSTRACT

Additive manufacturing methods use a surrogate slurry to iteratively develop an additive manufacturing protocol and then substitutes a final slurry composition to then additively manufacture a final component using the developed additive manufacturing protocol. In the nuclear reactor component context, the final slurry composition is a nuclear fuel slurry having a composition: 30-45 vol. % monomer resin, 30-70 vol. % plurality of particles of uranium-containing material, >0-7 vol. % dispersant, photoactivated dye, photoabsorber, photoinitiator, and 0-18 vol. % (as a balance) diluent. The surrogate slurry has a similar composition, but a plurality of surrogate particles selected to represent a uranium-containing material are substituted for the particles of uranium-
(Continued)

containing material. The method provides a means for in-situ monitoring of characteristics of the final component during manufacture as well as in-situ volumetric inspection. Compositions of surrogate slurries and nuclear fuel slurries are also disclosed.

34 Claims, 6 Drawing Sheets

(51) Int. Cl.
    *B33Y 70/10*     (2020.01)
    *B33Y 80/00*     (2015.01)
    *C08F 2/08*     (2006.01)
    *C08F 2/54*     (2006.01)
    *C08F 20/14*     (2006.01)
    *C08F 22/10*     (2006.01)
    *C08K 3/08*     (2006.01)
    *C08K 3/10*     (2018.01)
    *C08K 3/14*     (2006.01)
    *C08K 3/16*     (2006.01)
    *C08K 3/22*     (2006.01)
    *C08K 5/00*     (2006.01)
    *C08K 5/101*     (2006.01)
    *C08K 5/19*     (2006.01)
    *C08K 5/3492*     (2006.01)
    *C08K 5/5397*     (2006.01)
    *G21C 3/04*     (2006.01)
    *G21C 3/50*     (2006.01)
    *G21C 21/00*     (2006.01)

(52) U.S. Cl.
    CPC ............... *C08F 2/08* (2013.01); *C08F 2/54* (2013.01); *C08F 20/14* (2013.01); *C08F 22/1006* (2020.02); *C08K 3/08* (2013.01); *C08K 3/10* (2013.01); *C08K 3/14* (2013.01); *C08K 3/16* (2013.01); *C08K 3/22* (2013.01); *C08K 5/0041* (2013.01); *C08K 5/101* (2013.01); *C08K 5/19* (2013.01); *C08K 5/3492* (2013.01); *C08K 5/5397* (2013.01); *G21C 3/04* (2013.01); *G21C 3/50* (2013.01); *G21C 21/00* (2013.01); *C08K 2003/0887* (2013.01); *C08K 2003/221* (2013.01); *C08K 2201/005* (2013.01); *C08K 2201/006* (2013.01)

(58) Field of Classification Search
    CPC .... C08F 2/54; C08K 3/10; C08K 3/14; C08K 3/16; C08K 3/18; C08K 3/28; C08K 3/34
    See application file for complete search history.

(56) References Cited

U.S. PATENT DOCUMENTS

| | | | |
|---|---|---|---|
| 11,591,484 B1 * | 2/2023 | Schaedler | B29C 64/106 |
| 2007/0238804 A1 * | 10/2007 | Ho | A61K 6/20 |
| | | | 522/77 |
| 2018/0326480 A1 * | 11/2018 | Opschoor | B33Y 10/00 |
| 2019/0070748 A1 | 3/2019 | Comte et al. | |
| 2020/0180214 A1 * | 6/2020 | Provin | B33Y 70/00 |

FOREIGN PATENT DOCUMENTS

| | | |
|---|---|---|
| JP | 2008-189821 A | 8/2021 |
| KR | 2008-0073215 A | 8/2008 |
| WO | 2017/081160 A1 | 5/2017 |
| WO | 2018/036813 A1 | 3/2018 |
| WO | 2019/009001 A1 | 1/2019 |

OTHER PUBLICATIONS

Extended European Search Report dated Dec. 7, 2022 in European Application 20835521.4.
Qaderi, Polyethylene Glycol Diacrylate (PEGDA) Resin Development for 3D-Printed Microfluidic Devices, Brigham Young University (2015). Retrieved from https://scholarsarchive.byu.edu/etd/5555/.
Wu et al., "Effect of the Particle Size and the Debinding Process on the Density of Alumina Ceramics Fabricated by 3D Printing Based on Stereolithography", Ceramics International, 42(15), 17290-17294 (2016).
Eckel et al., "Additive Manufacturing of Polymer-Derived Ceramics", Science, vol. 351, Issue 6268 (Jan. 1, 2016) pp. 58-62.
Hundley et al., "Geometric Characterization of Additively Manufactured Polymer Derived Ceramics", Additive Manufacturing, 18, 95-102 (2017).
Ackermann et al., "Visible and Ultraviolet Absorption Properties of Uranium Dioxide Films", Journal of the Optical Society of America, 49(11), 1107 (1959).
Bienia et al., "Inkjet Printing of Ceramic Colloidal Suspensions: Filament Growth and Breakup", Chemical Engineering Science, 149, 1-13 (2016).
Harp et al., "Uranium Silicide Fabrication for Use in LWR Accident Tolerant Fuel (Rep.)", Idaho Falls, ID: Idaho National Laboratory.
Kuznetsov et al., "Innovative Nuclear Energy Systems: State-of-the-Art Survey on Evaluation and Aggregation Judgment Measures Applied to Performance Comparison", Energies, 8(5), 3679-3719 (2015).
Ledergerber et al., "Inert Matrix Fuel for the Utilisation of Plutonium", Progress in Nuclear Energy, 38(3-4), 301-308 (2001).
Pouchon, "Gelation and Other Innovative Conversion Processes for Aqueous-Based Reprocessing and Recycling of Spent Nuclear Fuels", Reprocessing and Recycling of Spent Nuclear Fuels, pp. 353-369, Woodhead Publishing (2015).
Pouchon et al., "Modeling of Sphere-Pac Fuel", Comprehensive Nuclear Materials, pp. 789-817, Elsevier (2012).
Pouchon et al., "Sphere-Pac and VIPAC Fuel", Comprehensive Nuclear Materials, pp. 275-817, Elsevier (2012).
Pouchon et al., "3D Ceramic Printing of Nuclear Fuel" (Rep.) (2016).
Ren et al., "3D Gel-Printing—An Additive Manufacturing Method for Producing Complex Shape Parts", Materials & Design, 101, 80-87 (2016).
Streit et al., "(Pu, Zr)N Annular Fuel Pellets Shaped by Direct Coagulation Casting", Journal of Nuclear Science and Technology, 39, 741-744 (2014).
Wang et al., "Ceramic Injection Molding", Elsevier (2016).
Wu et al., "Syntheses of Colloidal Uranium-Dioxide Nanocrystals", Journal of the American Chemical Society, 128(51), 16522-16523 (2006).
Ledergerber et al., "Preparation of Transuranium Fuel and Target Materials for the Transmutation of Actinides by Gel Coconversion", Nuclear Technology, 114:2, 194-204 (1996); doi:10.13182/nt96-a35249.
International Search Report and Written Opinion dated Feb. 12, 2021 in International Application No. PCT/US2020/025944.
Yuan et al., "Machine-Learning-Based Monitoring of Laser Powder Bed Fusion", Adv. Mater. Technol. 2018, pp. 1-6.
Fritz et al., "Electrosteric Stabilization of Colloidal Dispersions", Langmuir, 18(16), 6381-6390 (2002).
Kong et al., "Electrosteric Stabilization of Concentrated Cement Suspensions Imparted by a Strong Anionic Polyelectrolyte and a Non-Ionic Polymer", Cement and Concrete Research, 36(5), 842-850 (2006).
McCain, "Development of Hydriding Procedures Theory and Application", (rep.). General Electric (1961).
Kirillova et al., "Optical Properties of Molybdenum", Journal of Experimental and Theoretical Physics, 33(6), 1210 (1971).
Liu et al., "Microstructure and Mechanical Properties of Al2O3/ZrO2 Directionally Solidified Eutectic Ceramic Prepared by Laser 3D Printing", Journal of Materials Science & Technology, 32(4), 320-325 (2016).

(56) References Cited

OTHER PUBLICATIONS

Özdemir et al., "Optical Properties of Metals", Ulm University (Apr. 28, 2014), 14 pages.
Bae et al., "Influence of Residual Monomer on Cracking in Ceramics Fabricated by Stereolithography", International Journal of Applied Ceramic Technology, 8(6), 1289-1295 (2010).
Brady et al., "Curing Behavior of Ceramic Resin for Stereolithography." In Solid Freeform Fabrication Symposium (1996), retrieved from https:https://repositories.lib.utexas.edu/handle/2152/70264.
Griffith et al., "Scattering of Ultraviolet Radiation in Turbid Suspensions", Journal of Applied Physics, 81(6), 2538-2546 (1996).
Halloran, Free Form Fabrication of Ceramics by Stereolithography (Rep.), Office of Naval Research (1997).
Halloran, "Ceramic Stereolithography: Additive Manufacturing for Ceramics by Photopolymerization", Annual Review of Materials Research, 46(1), 19-40 (2016).
Lee et al, "Cure Depth in Photopolymerization: Experiments and Theory", Journal of Materials Research, 16(12), 3536-3544 (2001).
Mitteramskogler et al., "Light Curing Strategies for Lithography-Based Additive Manufacturing of Customized Ceramics", Additive Manufacturing, 1-4, 110-118 (2014).
International Preliminary Report on Patentability dated Sep. 28, 2021 in International Application No. PCT/US2020/025944.
Shama et al., "Simulation of the microfluidic mixing and the droplet generation for 3D printing of nuclear fuels", Additive Manufacturing, Dec. 21, 2018, vol. 26, pp. 1-14.
Office Action dated Mar. 12, 2024, issued in corresponding Japanese Patent Application No. 2021-560379.

\* cited by examiner

COMPOSITIONS FOR ADDITIVE MANUFACTURING AND METHODS OF ADDITIVE MANUFACTURING, PARTICULARLY OF NUCLEAR REACTOR COMPONENTS

RELATED APPLICATION DATA

This application is based on and claims priority under 35 U.S.C. § 119 to U.S. Provisional Application No. 62/827,670, filed Apr. 1, 2019, the entire contents of which are incorporated herein by reference.

TECHNICAL FIELD AND INDUSTRIAL APPLICABILITY

The disclosure relates generally to compositions used in additive manufacturing and methods of additive manufacturing. In particular, the disclosed compositions can be used as a surrogate slurry in an additive manufacturing process for manufacturing a component, by which an additive manufacturing protocol is developed, and the additive manufacturing protocol can then be used with suitable materials, such as fuel assembly structure materials (e.g., Ni, W, Mo or N—W—Mo alloys), moderator materials (e.g., graphite, boron, or carbon-based materials), and nuclear fuel slurry materials (e.g., uranium or uranium-molybdenum based materials), to additively manufacture a semi-finished or finished component, such as a component for use in a nuclear reactor. In the nuclear reactor component context, the surrogate slurry includes 30 vol. % to 70 vol. % of a plurality of surrogate particles selected to represent a uranium-containing material and these surrogate particles are then replaced in the nuclear fuel slurry by particles having a composition including uranium-containing material, such as a uranium metal, a uranium metal alloy, a uranium ceramic, or a uranium-molybdenum alloy. In related aspects, the disclosed slurries and additive manufacturing processes can be used for in-situ volumetric inspection in which an additive manufacturing product includes a photoactivated dye component that is exposed to a light source, such as a ultraviolet-active dye component that is activated by exposure to an ultraviolet (UV) light to produce a signal that can be inspected for identification of manufacturing defects. The disclosure also relates to the composition of surrogate slurries and to the composition of the nuclear fuel slurries per se.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Various processes can be used by which material is joined or solidified under computer control to create a three-dimensional object, for example, by adding material together (such as liquid molecules or powder grains being fused together). There are many different technologies, based on melting/depositing technologies or on deposition/curing technologies, and these technologies can be used to manufacture objects of almost any shape or geometry using digital model data from, for example, a 3D model or another electronic data source such as a computer-aided design (CAD) model or an Additive Manufacturing File (AMF) file (usually in sequential layers).

A large number of these manufacturing processes are available. The main differences between processes are in the way layers are deposited to create parts and in the materials that are used, each method/material having advantages and drawbacks. Some methods melt or soften the material to produce the layers. Examples include fused filament fabrication (FFF), also known as fused deposition modeling (FDM), fused particle fabrication (FPF) or fused granular fabrication (FGF), which produces components by extruding small beads or streams of material which harden immediately to form layers. Other methods cure liquid materials using different technologies, each of which solidifies the liquid material in a layer-by-layer approach to build up the manufactured object. Examples include stereolithography (SL) utilizing various optical- or chemical-based curing processes (with associated opto-reactive or chemi-reactive materials). In each instance, the manufactured product has properties based on the material of manufacture.

SUMMARY

In general, the disclosure relates to compositions used in additive manufacturing and methods of additive manufacturing. Because of the sequential, layer-by-layer manufacturing process, the disclosed additive manufacturing process are suitable for manufacture of complex components. In the nuclear reactor component context, examples of complex components include fuel assemblies (e.g., arrangements of fuel elements (which contain the fuel and burnable poisons), mechanical support for the fuel assembly structure, spacer grids (which ensure a spacing of components and guiding of the fuel elements), and non-fuel tubes for, e.g., control rods or in-core instrumentation and the like) (also known as fuel bundles). Complexity of structure extends to other systems in a nuclear reactor, including the various components of the primary cycle (meaning those systems subject to, in contact with or otherwise exposed to the primary coolant), such as, depending on design, tubing, pumps, instrumentation, heat exchangers, and steam generators. Accordingly, construction of fuel elements, fuel assemblies, reactor cores, and reactor systems are all subject to rigorous design and manufacturing standards as well as extensive pre-, during, and post-manufacturing controls, such as those related to sourcing, handling, installing, inspecting and testing.

The use of the disclosed methods of additive manufacturing has been found to be advantageous to the manufacture of these complex structures, in particular the fuel element and fuel assembly, and improves both the manufacturing process itself as well as the manufactured complex structure, including the quality assurance of such structures. The use of the disclosed methods of additive manufacturing coupled with the disclosed compositions has been found to be particular advantageous for these ends.

Embodiments disclosed herein include methods for additive manufacturing a component, particular a component of a fission reactor, as well as compositions of slurries to be used in additive manufacturing of such components, both during additive manufacturing process development and prototype development, as well as in final manufacture of in-service parts.

Embodiments of a method for manufacturing a component of a nuclear reactor system comprises using a surrogate slurry to iteratively developing an additive manufacturing protocol, substituting a nuclear fuel slurry for the surrogate slurry in the developed additive manufacturing protocol, and manufacturing a green body of a component of a nuclear reactor system using the nuclear fuel slurry in the developed additive manufacturing protocol.

Embodiments of a nuclear fuel slurry for additive manufacturing have a composition comprising (in vol. % relative to total volume of the powders): 30 vol. % to 45 vol. % of a monomer resin, 45 vol. % to 60 vol. % of a plurality of particles, >0 vol. % to 7 vol. % of a dispersant, greater than 0 vol. % of a photoactivated dye, greater than 0 vol. % of a photoabsorber, greater than 0 vol. % of a photoinitiator, and 0 vol. % to 20 vol. % (as a balance) of a diluent. The particles have a composition including a uranium-containing material. In some embodiments, the uranium-containing material is a uranium metal, a uranium metal alloy, a uranium ceramic, or a uranium-molybdenum alloy. In some embodiments, the uranium-containing material is a uranium oxide, a uranium dioxide, a uranium carbide, a uranium oxycarbide, a uranium nitride, a uranium silicide, a uranium fluoride, a uranium chloride, a cermet of uranium oxide and tungsten, a cermet of uranium dioxide and tungsten, a cermet of uranium oxide and molybdenum, or a cermet of uranium dioxide and molybdenum, a Zr- or Si-based ceramic composite such as ZrC—UC or SiC—UN. In addition, other uranium-containing material can be used, including those containing inorganic species and those containing organic ligand/anionic species.

In example embodiments, the enrichment of U235 in the uranium-containing material is greater than 0%. For some NTP applications, the enrichment is less than 20%, preferably 19.75% enrichment or less. For other NTP applications, the enrichment is 90% to 98%. For some CANDU applications, the enrichment is at natural levels. For some terrestrial power reactor applications, enrichment is less than 20%, preferably 4% to 15% enrichment. In alternative embodiments, the enrichment of the uranium-containing material can use other fissile material, such as thorium-based.

In one particular embodiment, the nuclear fuel slurry for additive manufacturing has a composition comprising: 30 vol. % to 45 vol. % of an acrylate-based monomer resin, 45 vol. % to 60 vol. % of a plurality of particles having a composition including a uranium-containing material, >0 vol. % to 7 vol. % of a dispersant suitable to disperse the plurality of particles in the nuclear fuel slurry, greater than 0 vol. % of a photoactivated dye for subsequent activation during quality control inspection, greater than 0 vol. % of a photoabsorber stops the free-radicalization polymerization of the slurry and thereby reduces cross-linking and greater than 0 vol. % of a photoinitiator selected to match the wavelength of light that will be used to cure the slurry composition, or vice versa, and 0 vol. % to 18 vol. % (as a balance) of a methylnaphthalene as a diluent.

In one particular embodiment, the surrogate slurry for additive manufacturing has a composition comprising: 30 vol. % to 45 vol. % of an acrylate-based monomer resin, 45 vol. % to 60 vol. % of a plurality of surrogate particles having a composition including yttria-stabilized zirconia (YSZ), >0 vol. % to 7 vol. % of a dispersant suitable to disperse the plurality of particles in the nuclear fuel slurry, greater than 0 vol. % of a photoactivated dye for subsequent activation during quality control inspection, greater than 0 vol. % of a photoabsorber stops the free-radicalization polymerization of the slurry and thereby reduces cross-linking and greater than 0 vol. % of a photoinitiator selected to match the wavelength of light that will be used to cure the slurry composition, or vice versa, and 0 vol. % to 18 vol. % (as a balance) of a methylnaphthalene as a diluent.

An additive manufacturing protocol, such as a stereolithographic additive manufacturing protocol, can be developed using a surrogate slurry and iteratively adjusting the additive manufacturing parameters until the additive manufacturing protocol manufactures a desired component of desired quality. An example embodiment of such a method of developing an additive manufacturing protocol using a surrogate slurry comprises preparing a first surrogate slurry for additive manufacturing, preparing a first green body from the first surrogate slurry by a first additive manufacturing technique, identifying defects present in the first green body, adjusting a composition of the first surrogate slurry or a parameter of the first additive manufacturing technique based on one or more of the identified defects, and preparing a second green body from (a) an adjusted first surrogate slurry by the additive manufacturing technique, (b) the first surrogate slurry by an adjusted first additive manufacturing technique, or (c) an adjusted first surrogate slurry by an adjusted first additive manufacturing technique.

Further, embodiments disclosed herein can be used to qualify designs and validate acceptable fabrication of fission reactors as well as individual components of fission reactors. For example, methods of manufacturing components of a nuclear reactor disclosed herein can also be used to determine and confirm the performance and integrity of the as-built structures. As such, the methods can serve as a means to qualify a reactor or a component of a reactor with, or provide information for acceptance criteria by, third parties, for example, government regulatory agencies, government agencies and departments, commercial entities such as power companies, and the like.

An example embodiment of such a method of in-situ volumetric inspection comprises exposing an additive manufacturing product to a light source, such as light having a wavelength of 300 nm to 750 nm or to ultraviolet light, wherein the additive manufacturing product includes a photoactivated dye component and the step of exposing activates the photoactivated dye component to produce a signal, optically inspecting the exposed additive manufacturing product, and identifying a manufacturing defect in the additive manufacturing product based on a comparison of the signal produced by the activated photoactivated dye component to a standard. In one particular embodiment, the additive manufacturing product is a green body of a component of a nuclear reactor system and the additive manufacturing product is manufactured by a stereolithographic additive manufacturing protocol with a nuclear fuel slurry.

Although the disclosed reactor and core have components with complex mechanical geometries, integral and iterative manufacturing including the fissionable fuel material enables the components to be more easily manufactured. Other advantages include the ability to inspect the component, in-situ and on a layer-by-layer basis.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

DETAILED DESCRIPTION

Figure 1:
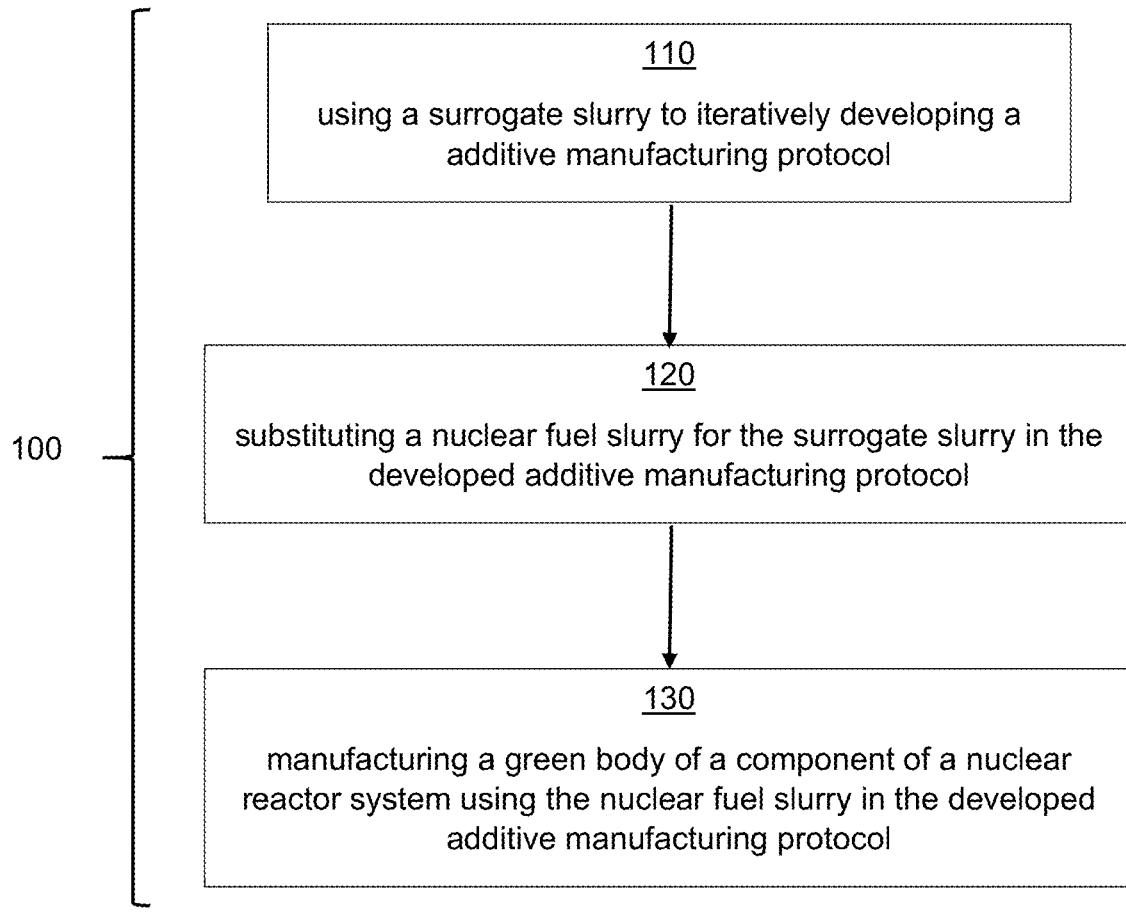
FIG. 1 illustrates steps in an example method for manufacturing a component of a nuclear reactor system.

FIG. 1 illustrates steps in an example method 100 for manufacturing a component of a nuclear reactor system. The example method 100 comprises using a surrogate slurry to iteratively developing an additive manufacturing protocol 110 (preferably a stereolithographic additive manufacturing protocol), substituting a nuclear fuel slurry for the surrogate slurry in the developed additive manufacturing protocol 120, and manufacturing a green body of a component of a nuclear reactor system using the nuclear fuel slurry in the developed additive manufacturing protocol 130.

The additive manufacturing protocol can be developed and/or adapted for use in any suitable additive manufacturing process. Examples of suitable additive manufacturing processes are disclosed in ISO/ASTM52900-15, which defines categories of additive manufacturing processes, including: binder jetting, directed energy deposition, material extrusion, material jetting, powder bed fusion, sheet lamination, and photopolymerization. The contents of ISO/ASTM52900-15 are incorporated herein by reference. Sterolithography is a form of additive manufacturing using photopolymerization processes. In example embodiments, stereolithographic additive manufacturing techniques include photoinitiation from exposure to ultraviolet radiation or beta radiation. In some example embodiments, the ultraviolet radiation is generated in a digital light processor (DLP) or in a stereolithography apparatus (SLA). In other example embodiments, the beta radiation is generated in electron-beam (EBeam) equipment or electron irradiation (EBI) equipment. Although the methods and compositions disclosed herein are described within the context of stereolithography, it is expressly contemplated that such methods and compositions can be extended to and or adapted to other additive manufacturing processes.

In the example method 100, the additive manufacturing protocol is iteratively developed using a surrogate slurry 110. The surrogate slurry is a surrogate for a nuclear fuel slurry. In this regard, the surrogate slurry has a composition that is designed to mimic the behavior in the additive manufacturing process of the nuclear fuel slurry. This is achieved by using a surrogate particle for the nuclear fuel particle, in particular using a surrogate particle that is selected to represent a uranium-containing material. Additional details regarding the surrogate slurry and its composition and the nuclear fuel slurry and its composition are disclosed below.

The additive manufacturing protocol is developed in an iterative process. For example, repetition of the additive manufacturing process with adjustment of (a) the additive manufacturing process parameters, such as movement of the deposition stage (spatially and temporally), temperatures associated with deposition, sequencing of steps, etc . . . , and (b) the composition, such as the constituents of the slurry composition and their concentration or vol. %, are adjusted in subsequent repetitions of the process. Adjustment of (a) and (b) can be based on parameters determined from the manufactured component including, for example, one or more mechanical properties, one or more chemical properties, and identification of one or more physical and/or chemical defects. Adjustment of (a) and (b) can occur singly or collectively to arrive at a final additive manufacturing protocol (also called the developed additive manufacturing protocol), which will thereby include both slurry composition information as well as digital model data, for example, a 3D model or another electronic data source such as a computer-aided design (CAD) model or an Additive Manufacturing File (AMF) file or a stereolithography contour (SLC) file.

Figure 2:
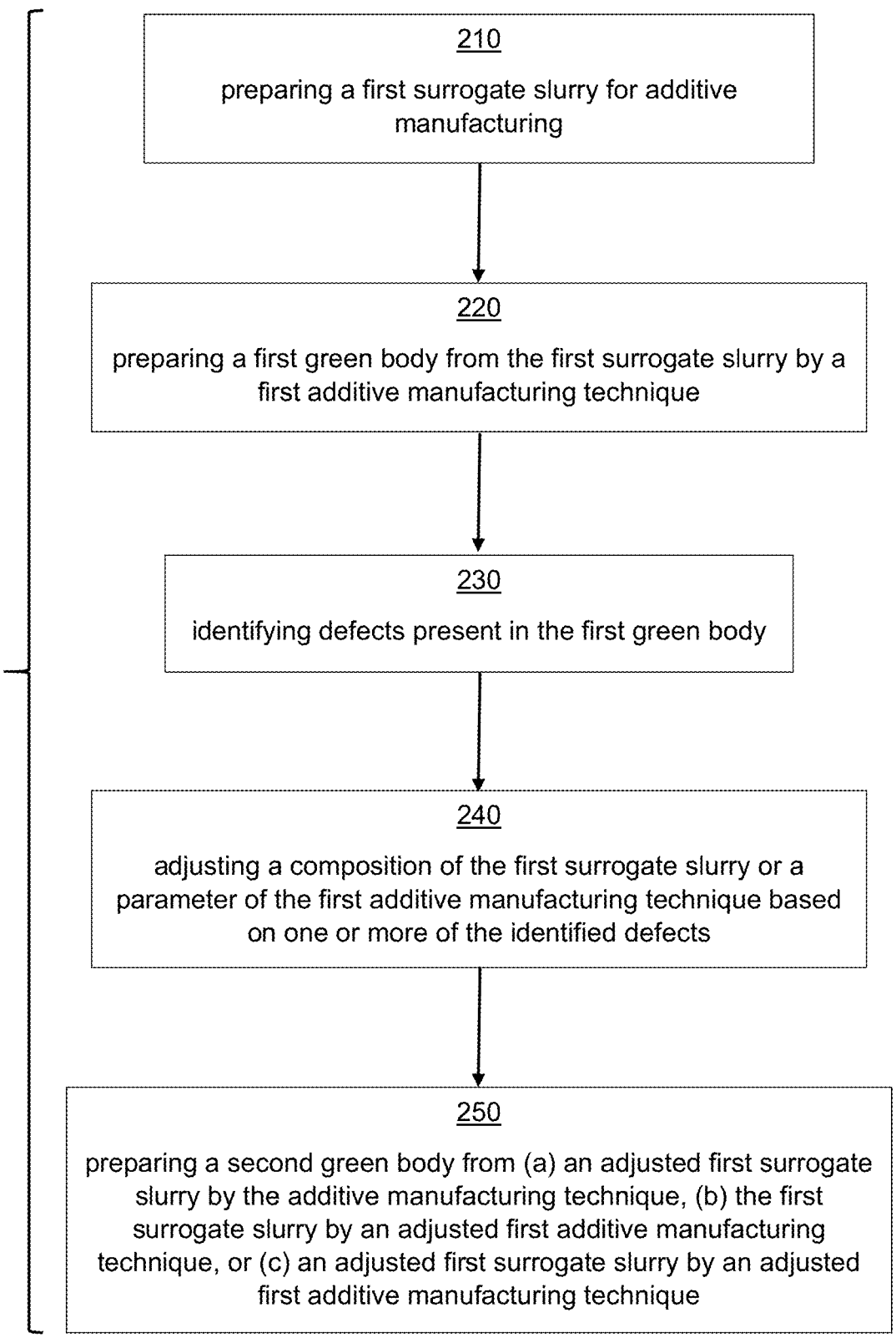
FIG. 2 illustrates steps in an example iterative process for developing an additive manufacturing protocol using a surrogate slurry.

An example iterative process for developing an additive manufacturing protocol using a surrogate slurry is set forth in FIG. 2. In the example iterative process 200, a first surrogate slurry for additive manufacturing is prepared 210. The first surrogate slurry has a composition as disclosed herein. Using the first surrogate slurry, a first green body is formed by a first additive manufacturing technique 220. The first additive manufacturing techniques can be any of the additive manufacturing techniques disclosed herein. The first green body is then inspected and/or tested to identify defects and other deviations from the desired final manufactured product 230. This inspection and/or testing can include any suitable inspection and testing, including mechanical, visual, and chemical.

Based on one or more of the identified defects and/or other deviations, a composition of the first surrogate slurry or a parameter of the first additive manufacturing technique can be adjusted 240. For example, constituents of the composition can be adjusted (either the materials chemistry or the amounts of constituents) and varied within the composition disclosed herein. As another example, one or more parameters of the first additive manufacturing technique can be adjusted and varied, such as movement of the deposition stage (spatially and temporally), temperatures associated with deposition, sequencing of steps, etc . . . . . Other process parameters that can be adjusted include parameters such as: increasing the temperature of the resin bath to higher temperatures, reducing viscosity, creating a more uniform print layer thickness, adjusting the delay before irradiation to allow for proper leveling of an additive manufacturing print layer, adjusting movement speeds to allow for mitigation of hydraulic bearing forces and print window delamination, providing multiple light exposures per layer to limit scattering and increase depth of cure, and continuously varying intensity exposures (movies) to optimize desired properties. Other design parameters that can be adjusted include parameters such as: altering the design for thin geometries that are below the capabilities to be printed, increasing/removing pores which are too small and can become occluded during exposure by scattering, adding drain or cleaning holes to the part to aid in trapped resin removal, combining gyroid and lattice forms to support delicate geometry with structurally and neutronically useful material. The adjustments in composition and/or parameters can occur independently or in combination. Also, the adjustments in composition and/or parameters can be implemented in subsequent iterations of the in-progress iterative process 200 or in a subsequent iterative process 200. Alternatively, the adjustment of a composition of the first surrogate slurry or of a parameter of the first additive manufacturing technique can be conducted to determine the effect of varying such composition/parameters. Information on such cause and effect can be developed and used in subsequent iterations of the in-progress iterative process 200 or in a subsequent iterative process 200.

Subsequent to adjusting a composition of the first surrogate slurry or a parameter of the first additive manufacturing technique, the example iterative process 200 prepares a second green body 250. This second green body (and subsequent green bodies in the iterative process) is adjusted in one or more ways. The adjustments can include: (a) adjusting a first (or subsequent) surrogate slurry and using that adjusted surrogate slurry in the additive manufacturing technique, (b) using the first surrogate slurry (i.e., an unadjusted surrogate slurry) in an adjusted first (or subsequent) additive manufacturing technique, or (c) adjusting a first (or subsequent) surrogate slurry and using that adjusted surrogate slurry in an adjusted first (or subsequent) additive manufacturing technique.

The process of preparing a green body from the surrogate slurry by an additive manufacturing technique, identifying defects in the green body, and adjusting the composition of the surrogate slurry or a parameter of the additive manufacturing technique can be repeated, as necessary, to arrive at an additive manufacturing protocol that produces a green body having desired properties. The additive manufacturing protocol can then be used with a nuclear fuel slurry to produce a green body of a desired component, such as a component for a nuclear reactor.

In the example method 100, once a developed additive manufacturing protocol is obtained, a nuclear fuel slurry is substituted for the surrogate slurry in the developed additive manufacturing protocol 120. Then, a green body of a component of a nuclear reactor system is manufactured 130 using the nuclear fuel slurry in the developed additive manufacturing protocol. Because the surrogate slurry mimics the nuclear fuel slurry in the additive manufacturing process, using the nuclear fuel slurry in the developed additive manufacturing protocol results in a manufactured green body of a component that is at least materially the same if not the same as that manufactured using the surrogate slurry (or within manufacturing tolerances) but for the substitution of the nuclear fuel particles, e.g., uranium-containing material, for the surrogate particles.

Subsequently, the manufactured green body can be sintered to form the manufactured component, such as a manufactured component of the nuclear reactor system. Other suitable forms of consolidation can be used to form the manufactured component, including combinations of temperature, pressure, and atmosphere. The consolidated manufactured component can be further processed by, for example, one or more of machining, grinding, polishing, coating, carburizing, nitriding, oxidizing, and etching.

Examples of a surrogate slurry for additive manufacturing have a composition comprising a monomer resin, a plurality of surrogate particles, a dispersant, a photoactivated dye, a photoabsorber, a photoinitiator, and a diluent. Examples of a nuclear fuel slurry for additive manufacturing have a composition comprising a monomer resin, a plurality of uranium-containing particles, a dispersant, a photoactivated dye, a photoabsorber, a photoinitiator, and a diluent.

Both the surrogate slurry and the nuclear fuel slurry include a monomer resin present in an amount of 30 vol. % to 45 vol. %, alternatively 35 vol. % to 40 vol. %. In particular examples, the monomer resin is an acrylate-based monomer resin or a methacrylate-based monomer or mixtures thereof. In some embodiments, the monomer resin is at least 50% acrylate-based, alternatively 70 to 90% acrylate-based. In other embodiments, the acrylate-based monomer resin is functionalized, such as mono-functional, di-functional, tri-functional or tetra-functional or mixtures thereof. The acrylate-based monomer resin can be at least 50% di-functional, alternatively at least 80% di-functional, alternatively 70-90% di-functional. A particular example of a suitable acrylate-based monomer resin is hexane-diol di-acrylate (available under the brand name SR 238 from Sartomer (Arkema Group)). Another particular example of a suitable acrylate-based monomer resin is ethoxylated (4) pentaerythritol tetraacrylate (available under the brand name SR 494 from Sartomer (Arkema Group)). Alternatively, oligomer-based resins can be substituted for the acrylate-based monomer resins. Use of an oligomer-based resin can provide improvements over monomer resins in the areas of shrinkage control, rate of polymerization, and viscosity.

The nuclear fuel slurry contains particles of a uranium-containing material present in an amount of 30 vol. % to 70 vol. %, alternatively 30 vol. % to 60 vol. %, alternatively 45 vol. % to 60 vol. %, alternatively 50 vol. % to 55 vol. %, while the surrogate slurry includes surrogate particles present in an amount of 30 vol. % to 70 vol. %, alternatively 30 vol. % to 60 vol. %, alternatively 45 vol. % to 60 vol. %, alternatively 50 vol. % to 55 vol. %, where the surrogate particles are selected to represent the uranium-containing material. However, the amount of surrogate particles in the surrogate slurry varies based on surrogate selection parameters and the interaction characteristics, such as absorption, of the surrogate particles with the curative radiation. In example embodiments, the surrogate particle is a doped zirconia phase or a carbide, nitride, or boride or silicon or zirconium, which sufficiently match the neutron absorption cross-section and refractive index of uranium oxide, and the amount of surrogate particles in the surrogate slurry is 40-60 vol %, alternatively 40-55 vol %.

Examples of uranium-containing material include uranium metal, uranium metal alloy, uranium ceramic, and uranium-molybdenum alloy. In some embodiments, the uranium-containing material represented by the surrogate particles is a uranium oxide, a uranium dioxide, a uranium carbide, a uranium oxycarbide, a uranium nitride, a uranium silicide, a uranium fluoride, a uranium chloride, a cermet of uranium oxide and tungsten, a cermet of uranium dioxide and tungsten, a cermet of uranium oxide and molybdenum, or a cermet of uranium dioxide and molybdenum. In other embodiments, the uranium-containing material can be represented by the chemical formula $U(C,O,N,Si,F,Cl)$, where any one or more of carbon (C), oxygen (O), nitrogen (N), silicon (Si), fluorine (F), chlorine (Cl) and combinations thereof may be present, in either stoichiometric or non-stoichiometric amounts, with the uranium.

Other non-limiting examples of uranium-containing material include inorganic species such as $U(OH, B, Sb, P, As, S, Se, Te, Cl, Br, I)$; uranium hydroxides and hydrates; uranium bromide; uranium iodide; uranium selenides; uranium tellurides; uranium chloride; uranium sulfides; uranium borides; uranium phosphides; uranium arsenide and antimonide. Organic ligand/anionic species may also be used as the uranium-containing material. However, as the size of these polyatomic ions increases, there will be a limit above which the decreasing concentration of uranium mass is no longer favorable for manufacturing into structures for nuclear fuel related applications. Non-limiting examples of uranium-containing material include organic ligand/anionic species such as ammonium urinates; uranium carbonyl; uranyl nitrate; uranyl oxalate; uranyl peroxide; uranyl acetate; uranyl benzoate; uranyl tannate; and uranyl quinolinate.

Further, the uranium-containing material may be additively manufactured in one form and subsequently converted to another uniform form, such as by oxidation, reduction, carburization, nitriding in a sintering process. For example, uranium from the uranium-containing material formed during additive manufacturing can be converted to uranium oxide through an oxidation process.

In particular examples, the composition of the uranium-containing material that the surrogate particles in the surrogate slurry are selected to represent corresponds to the composition of the particles of uranium-containing material in the nuclear fuel slurry. Characteristics contributing to selection of surrogate particles include those shown in Table 1. The characteristics in Table 1 are presented in decreasing order of significance and are also grouped into three tiers—Tier I, Tier II and Tier III. Where applicable, the upper/lower bounds included in the selection criteria column of Table 1 are for the value of that characteristic for the surrogate particle in the surrogate slurry as compared to the value for that characteristic of the uranium containing material in the nuclear fuel slurry.

TABLE 1

Characteristics Contributing To Selection Of Surrogate Particles

| Tier | Characteristics | Selection Criteria - Upper/Lower Bound |
|---|---|---|
| I | Refractive index | Selected to be within ±0% to ±20%, alternatively within ±0 to 0.5%, of the same value |
|  | Absorption cross-section to incident radiation | within ±0 to ±10%, alternatively within ±0 to ±5% of the same value |
| II | D10 Particle Size D50 Particle Size D90 Particle Size Morphology Specific Surface Area* | Controlled to within ±10% of the same value |
| III | Density | Sufficient to maintain suspension in slurry during additive manufacturing process |
|  | Electrostatic Affinity | Sufficient to disperse the particles in the slurry during additive manufacturing process; relates more strongly to selection of dispersant |

*Specific Surface Area (SSA) is a BET specific surface area obtained from $N_2$ sorption isotherms Selection of the surrogate particles for the surrogate slurry is a balance of the characteristics in Table 1. In that regard, the characteristics in Tier I have been found to be more relevant to surrogate slurry performance than the characteristics in Tier II; likewise, the characteristics in Tier II have been found to be more relevant to surrogate slurry performance than the characteristics in Tier III. Additionally, to a first approximation, the characteristics in Tier I can be utilized in selecting a suitable surrogate particle. In particular examples, the surrogate particles have a composition including yttria-stabilized zirconia (YSZ), alumina ($Al_2O_3$), zirconia ($ZrO_2$), ceria ($CeO_2$), (silica ($SiO_2$), fused silica, zirconia toughened alumina (ZTA) ($Al_2O_3$—$ZrO_2$), alumina toughened zirconia (ATZ) ($ZrO_2$—$Al_2O_3$), or Kaolinite ($Al_2O_3 \cdot 2SiO_2 \cdot 2H_2O$). In still further examples, the surrogate particles have a composition including carbide, nitrides, borides, carbonitrides, carboborides, nitroborides, or carbonitroborides of transitions metals, such as silicon (Si) or zirconium (Zr), which are represented by M(C,N,B) where M is a transition metal and one or more of the elements C, N and B are present in stoichiometric or non-stoichiometric amounts. Specific examples, include ZrC, ZrN, ZrB, $ZrB_2$, SiC, SiN, SiB, $SiB_2$.

Other characteristics of the surrogate particles include a D10 particle size of 1 nm to 10 micron, alternatively 40 nm to 1 micron. In alternative embodiments, the D50 particle size is 1 nm to 10 micron, alternatively 40 nm to 1 micron, and the D90 particle size is 1 nm to 20 micron, alternatively 1 nm or 40 nm to 1 micron or 12 micron or 15 micron.

Both the surrogate slurry and the nuclear fuel slurry include a dispersant present in an amount of >0 vol. % to 7 vol. %, alternatively 3 vol. % to 7 vol. %, alternatively 4 vol. % to 6 vol. %. The particular dispersant is selected for its ability to disperse in the slurry composition both the surrogate particle and the particle of uranium-containing material. The amount of dispersant should be at least sufficient to fully coat the particles and sufficient to produce a well dispersed shear thinning non-Newtonian fluid and not be thixotropic. In one example, the slurry has a viscosity of less than or equal to 100000 centipoise (cP), alternatively less than or equal to 10000 cP. If the viscosity is too high, the slurry exhibits shear thickening.

In one aspect, the dispersant is selected such that a value for the electrostatic affinity of the dispersant is within 20%, alternatively within 10%, of a value for electrostatic affinity of the surrogate particles. In particular examples, the dispersant has a composition including a quaternary ammonium chloride, such as VARIQUAT® CC-9 or VARIQUAT® CC-42, both available from Evonik Industries AG, Germany, or is a high molecular weight polymeric dispersant, such is TEGO® Dispers 660 C or TEGO® Dispers 670, both available from Evonik Industries AG, Germany. In a further particular example, two different dispersants or a mixture of dispersants can be used. For example, a dispersant of a first composition and a dispersant of a second composition can be mixed a ratio of the first component to the second component (first component:second component) ranging from 2 to 2.5, alternatively from 2.15 to 2.35.

Both the surrogate slurry and the nuclear fuel slurry include a photoactivated dye, a photoabsorber, and a photoinitiator, each present in an amount of greater than 0 vol. %, alternatively 0.05 vol. % to 0.10 vol. %. In certain embodiments, the photoactivated dye, photoabsorber, and photoinitiator are selected to be effective with the radiation photosource, for example, the photoactivated dye, photoabsorber, and photoinitiator are selected to be effective between 300 nm and 750 nm, alternatively 300 nm and 600 nm or 400 nm to 560 nm. In one example, the photoactivated dye, photoabsorber, and photoinitiator are selected to be effective in the range of 620 nm and 640 nm.

The photoactivated dye provides visualization of the cured layer by changing the color upon curing. Such visualization can be detected under certain wavelengths, such as UV light, and can be used for fault detection or other inspection purposes. In particular examples, the photoactivated dye is a triarylmethane dye, preferably $C_{25}H_{30}ClN_3$ (available under the brand name Crystal violet from Sigma-Aldrich Corp., USA). Crystal violet is a blue, aniline-derived dye. In other particular examples, the photoactivated dye is present in an amount of 0.002 mol/liter of monomer resin.

The photoabsorber absorbs the incident radiation within certain wavelengths and stops or reduces the free-radicalization polymerization of the slurry resulting from those wavelengths and thereby reduces cross-linking. In particular examples, the photoabsorber is a triazine-based photoabsorber, preferably 2-hydroxyphenyl-s-triazine with 18-20% 2-methoxy-1-propyl-acetate (such as Tinuvin® 477, available from BASF, and which is a liquid triazine-based photoabsorber based on a red shifted tris-resorcinol-triazine chromophore that exhibits high thermal stability, excellent photo-permanence and minimal interaction with metal catalysts and amine crosslinkers).

The photoinitiator is selected to match the incident radiation used to cure the slurry composition, or vice versa. In particular examples, the photoinitiator is a Type I or Type II photoinitiator, preferably Bis(2,4,6-trimethylbenzoyl)-phenylphosphineoxide, such as OmniRad 819 (former Irgacure 819) available from IGM Resins, USA, and which is a photoinitiator for radical polymerization of unsaturated resins upon UV light exposure).

Both the surrogate slurry and the nuclear fuel slurry include a diluent present in an amount of 4 vol. % to 40 vol. % as a balance, alternatively 4 vol. % to 20 vol. % as a balance, alternatively 4 vol. % to 6 vol. % as a balance, alternatively 8 vol. % to 40 vol. % as a balance, alternatively 8 vol. % to 20 vol. % as a balance or 8 vol. % to 15 vol. % as a balance. Suitable diluents are liquid at room temperature and have a sufficiently low boiling point that the diluent can be driven-off at temperatures below 400° C., alternatively below 300° C. When the diluent is driven-off, small voids remain in the as-manufactured part and, in components for a nuclear reactor, the small voids provide an outgassing volume, which contributes to minimize or prevent cracking of the components. In particular examples, the diluent is methylnaphthalene.

The disclosed nuclear fuel slurries can be used in methods of additive manufacturing. Suitable additive manufacturing equipment can be utilized that can accommodate the specific requirements for the materials to be used in the manufacture of the component (such as chemical resistance), the specific requirements for utilization of the equipment itself (such as specific atmospheric or vacuum requirements), as well as can accommodate the size and geometry of the manufactured component. Examples of suitable additive manufacturing equipment include SLA and DLP machines, electron-beam-based additive manufacturing equipment, and DLP stereolithographic equipment, any one of which can be modified or adapted for specific requirements.

Example methods of additive manufacturing can comprise providing a design of a component to be manufactured to a controller of an additive manufacturing equipment. Such a design can be incorporated into an additive manufacturing protocol.

In an example method, a supply volume of the nuclear fuel slurry composition is established, such as a bath or reservoir. A base portion of a green body of the component is then formed by curing a portion of the slurry composition that is in contact with a movable base of the additive manufacturing equipment. Alternatively, a base portion can be pre-fabricated prior to the initiation of the additive manufacturing process. Additional portions of the green body of the component are formed on a layer-by-layer basis by, first, curing a portion of the slurry composition that is in contact with the base portion to form a first layer of a green body and then, second, curing a portion of the slurry composition that is in contact with the prior deposition layer of the green body to form the additional portions while translating the movable base relative to an interface between a surface of the supply volume and the most recently formed additional portion of the green body. The translation of the movable base is typically in accordance with the design of the component and as directed by the additive manufacturing protocol. In example embodiments, translating the movable base relative to the interface between the surface of the supply volume and the most recently formed additional portion of the green body has an X-axis resolution and a Y-axis resolution of 50 microns or better and has a Z-axis resolution of 20 microns or better. In example embodiments, each additional portion of the green body of the component formed on the layer-by-layer basis has a thickness of at least 25 microns, alternatively 25 microns to 50 microns. Once the layer-by-layer manufacture of the green body of the component is complete, the green body of the component can be removed from the additive manufacturing equipment and sintered (or processed by other debindering/consolidating techniques) to form a densified ceramic.

Figure 3:
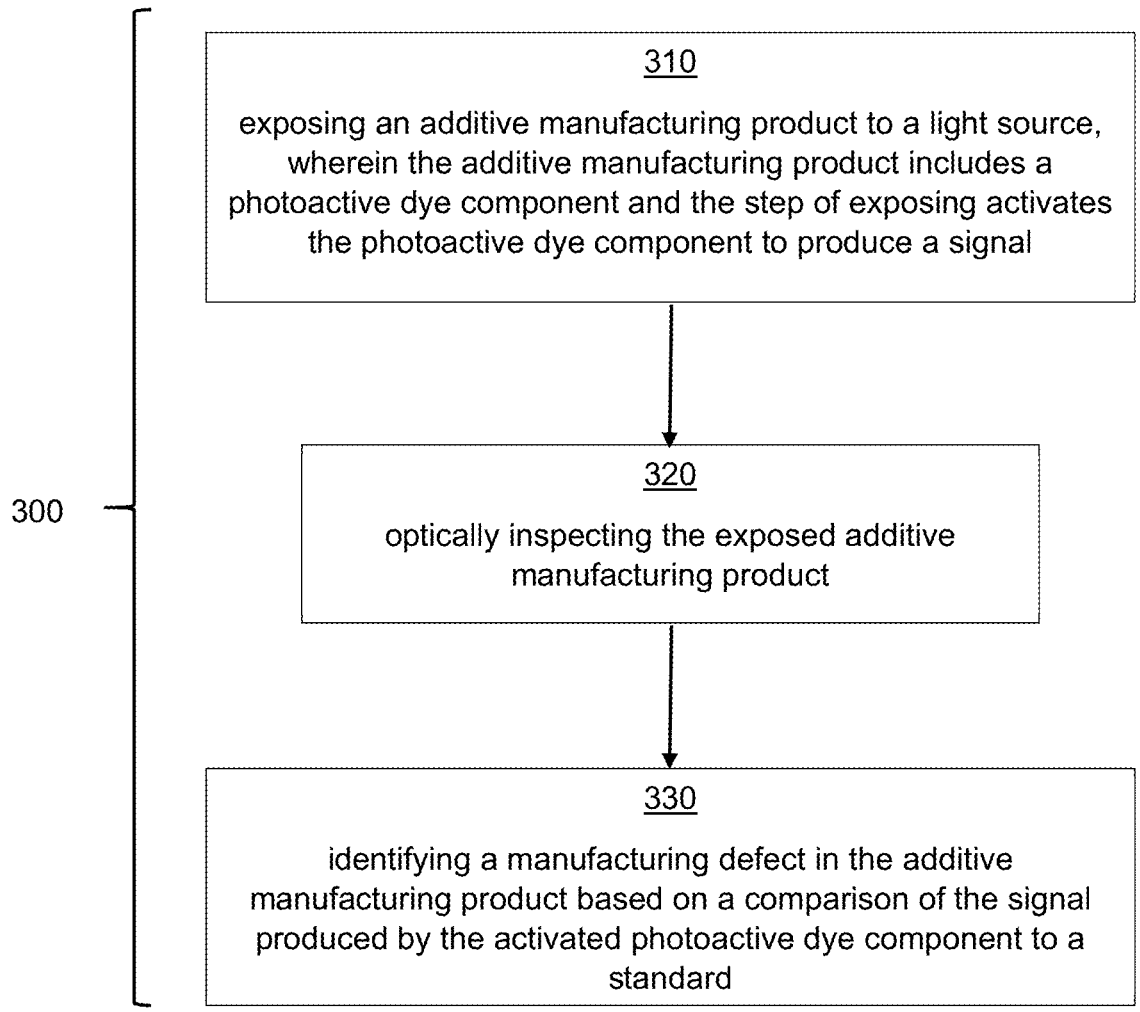
FIG. 3 illustrates steps in an example method of in-situ volumetric inspection.

The disclosed methods and slurries can be incorporated into and enable a method of in-situ volumetric inspection. FIG. 3 illustrates steps in an example method 300 of in-situ volumetric inspection. The example method 300 includes exposing 310 an additive manufacturing product to ultraviolet light, wherein the additive manufacturing product includes a UV-dye component. The step of exposing activates the UV-dye component to produce a signal and the exposed additive manufacturing product is then optically inspected 320, for example with a magnification device. The magnification device, such as a stereoscopic microscope, can include imaging capability as well as imaging analysis. Defects in the additive manufacturing product can be identified 330 based on a comparison of the signal produced by the activated UV-dye component to a standard.

Figure 4A:
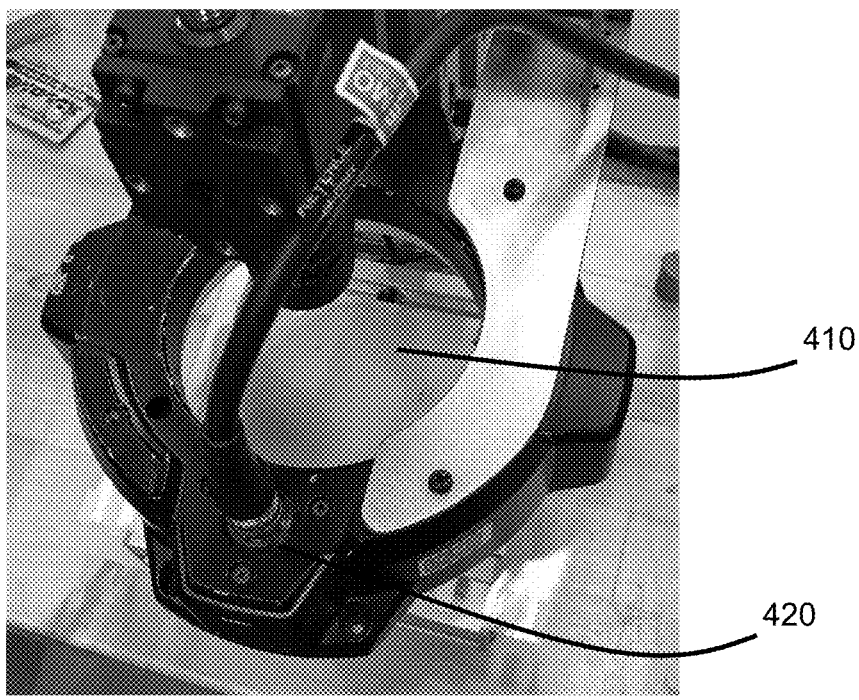
FIGS. 4A-B contain photographs related to visual inspection of a component manufactured consistent with the methods and surrogate slurry disclosed herein.
Figure 4B:
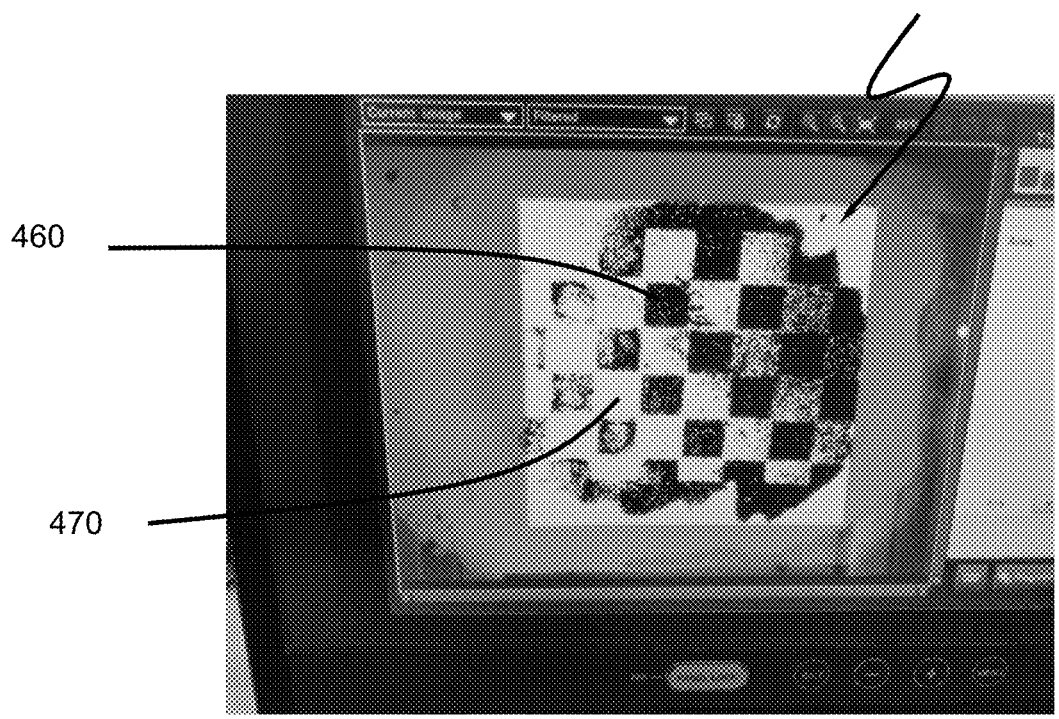

As noted herein, the photoactivated dye provides visualization of the cured layer by changing the color upon curing. Such visualization can be detected under UV light and can be used for fault detection or other inspection purposes. FIGS. 4A-B contain photographs related to visual inspection of a component manufactured consistent with the methods and surrogate slurry disclosed herein. FIG. 4A illustrates a component 410 being exposed to a UV light source 420. FIG. 4B shows an image 450 of the component 400 from FIG. 4A. The component 410 has a test pattern in which first regions contain a photoactivated dye and second regions do not contain a photoactivated dye. The distribution of the photoactivated dye is reflected in the image 450 in FIG. 4B, in which dark regions 460 correlate to first regions containing a photoactivated dye and light regions 470 correlate to second regions that do not contain a photoactivated dye. In the manufactured component, the quality of the manufacturing, such as density and shape, as well as any defects in such manufacturing, can be detected by comparing the shape of the first regions to a standard for the test pattern. Although demonstrated in FIGS. 4A-B using a test pattern, similar in-situ inspection procedures can be applied to more complex components and other quality parameters in an as-manufactured component. Although in-situ volumetric inspection is discussed herein in the context of UV light, any suitable radiation source can be used as long as that radiation source causes a detectable signal from the inspected structure.

Example Slurries

Two example surrogate slurry compositions are shown in Table 2. Both the constituent and the amount (on a vol. % of the slurry) is provided. Surrogate Slurry A is an acrylate-based slurry composition and does not include methacrylate; Surrogate Slurry B is a mixed acrylate- and methacrylate-based slurry composition. In both Surrogate Slurry A and Surrogate Slurry B, the surrogate particle is Yttria Stabilized Zirconia. Surrogate Slurry A has a separate diluent component, i.e., poly ethylene glycol. Surrogate Slurry B does not have a separate diluent component, but rather incorporates that diluent component into the monomer resin in the form of poly ethylene glycol from the methacrylate monomer solution.

TABLE 2

EXAMPLES OF SURROGATE SLURRIES

| Slurry Component | Surrogate Slurry A | | Surrogate Slurry B | |
|---|---|---|---|---|
| Monomer Resin | SR 238 (Hexane Diol Di-acrylate) | 36.7 vol. % | SR 238 (Hexane Diol Di-acrylate) | 36.7 vol. % |
| | | | CD545 (Poly Ethylene Glycol Mono-methacrylate) | 4.7 vol. % |
| Surrogate Particle | Yttria Stabilized Zirconia | 55 vol. % | Yttria Stabilized Zirconia | 55 vol. % |
| Dispersant | CC42 (Polypropoxy Quaternary ammonium chloride) | 3 vol. % | CC42 (Polypropoxy Quaternary ammonium chloride) | 3 vol. % |
| Photoactivated Dye | — | — | — | — |
| Photoabsorber | Tinuvin 477 (2-hydroxyphenyl-s-triazine with 18-20% 2-methoxy-1-propyl-acetate) | 0.2 vol. % | Tinuvin 477 (2-hydroxyphenyl-s-triazine with 18-20% 2-methoxy-1-propyl-acetate) | 0.2 vol. % |
| Photoinitiator | O819 (Bis(2,4,6-trimethylbenzoyl)-phenylphosphineoxide) | 0.4 vol. % | O819 (Bis(2,4,6-trimethylbenzoyl)-phenylphosphineoxide) | 0.4 vol. % |
| Diluent | Poly Ethylene Glycol | 4.7 vol. % | — | — |

One example nuclear fuel slurry composition is are shown in Table 3. Both the constituent and the amount (on a vol. % of the slurry) is provided. Nuclear Fuel Slurry X is an acrylate-based slurry composition and does not include methacrylate; Nuclear Fuel Slurry Y is a mixed acrylate- and methacrylate-based slurry composition. In both Nuclear Fuel Slurry X and Nuclear Fuel Slurry Y, the uranium containing material is $UO_2$. Nuclear Fuel Slurry X has a separate diluent component, i.e., poly ethylene glycol. Nuclear Fuel Slurry Y does not have a separate diluent component, but rather incorporates that component into the monomer resin in the form of poly ethylene glycol from the methacrylate monomer solution.

TABLE 3

EXAMPLES OF NUCLEAR FUEL SLURRIES

| Slurry Component | Nuclear Fuel Slurry X | | Nuclear Fuel Slurry Y | |
|---|---|---|---|---|
| Monomer Resin | SR 238 (Hexane Diol Di-acrylate) | 36.7 vol. % | SR 238 (Hexane Diol Di-acrylate) | 36.7 vol. % |
| | | | CD545 (Poly Ethylene Glycol Mono-methacrylate) | 4.7 vol. % |
| Particle of Uranium-containing Material | $UO_2$ | 55 vol. % | $UO_2$ | 55 vol. % |
| Dispersant | CC42 (Polypropoxy Quaternary ammonium chloride) | 3 vol. % | CC42 (Polypropoxy Quaternary ammonium chloride) | 3 vol. % |
| Photoactivated Dye | — | — | — | — |
| Photoabsorber | Tinuvin 477 (2-hydroxyphenyl-s-triazine with 18-20% 2-methoxy-1-propyl-acetate) | 0.2 vol. % | Tinuvin 477 (2-hydroxyphenyl-s-triazine with 18-20% 2-methoxy-1-propyl-acetate) | 0.2 vol. % |
| Photoinitiator | O819 (Bis(2,4,6-trimethylbenzoyl)-phenylphosphineoxide) | 0.4 vol. % | O819 (Bis(2,4,6-trimethylbenzoyl)-phenylphosphineoxide) | 0.4 vol. % |
| Diluent | Poly Ethylene Glycol | 4.7 vol. % | — | — |

Figure 5:
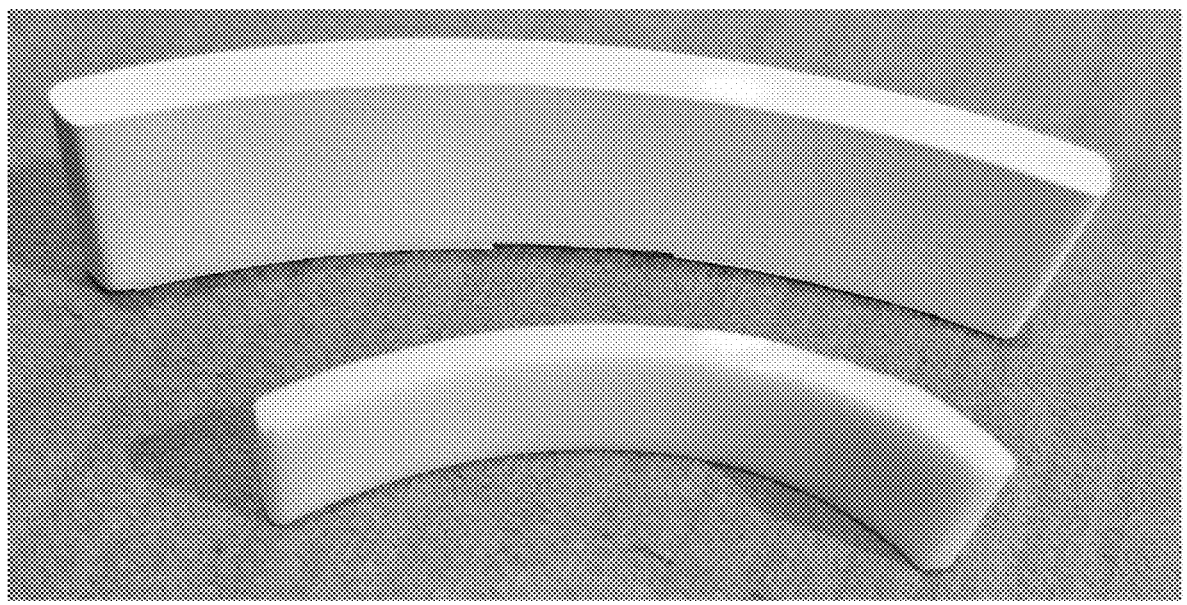
FIG. 5 is an image of a green body manufactured using a surrogate slurry and an additive manufacturing process consistent with that disclosed herein.

Of the above examples of surrogate slurries and nuclear slurries, the surrogate slurries A and B performed in that green bodies of example parts were able to be manufactured using AM. For example, FIG. 5 is an image of a green body manufactured using Surrogate Slurry A disclosed herein and manufactured using additive manufacturing, in particular using a digital light processor. The shown green body is in the form of a test structure, but could be formed in as any structure by using a suitable additive manufacturing protocol.

However, when the surrogate slurries were translated into the nuclear slurries X and Y, there was insufficient layer thickness to form a green body of substantial volume, i.e., bodies of 2 mm or less were formed. Thus, while the nuclear slurries of the above examples were capable of producing green bodies, the relatively small layer thickness and low volume formed for any one layer caused the manufacturing process to be inefficiently long.

Building on the above examples, further examples were prepared and studied. These further example nuclear fuel slurry M and nuclear fuel slurry N are shown in Table 4. Both the constituent and the amount (on a vol. % of the slurry) is provided. Nuclear Fuel Slurry M is an acrylate-based slurry composition and does not include methacrylate; Nuclear Fuel Slurry N is an acrylate-based slurry composition. In both Nuclear Fuel Slurry M and Nuclear Fuel Slurry N, the uranium containing material is $UO_2$. Both Nuclear Fuel Slurry M and Nuclear Fuel Slurry N utilize a separate diluent component, i.e., poly ethylene glycol or PRO14388 (a SR238 monomer/PEG-like diluent blend commercially available from Sartomer).

Figure 6:
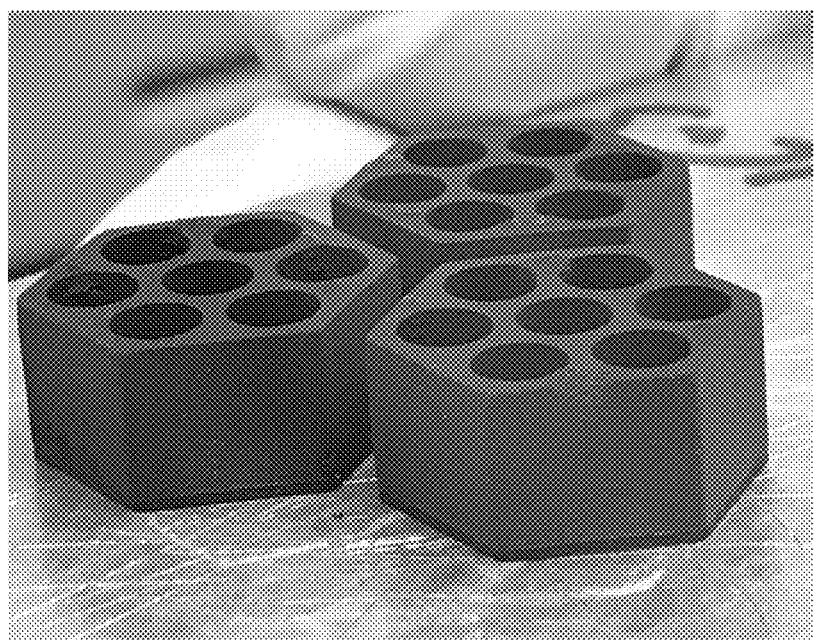
FIG. 6 is an image of a group of second green bodies manufactured using a surrogate slurry and an additive manufacturing process consistent with that disclosed herein.

Both Nuclear Fuel Slurry M and Nuclear Fuel Slurry N were used in an additive manufacturing process, in particular using a digital light processor. Nuclear Fuel Slurry N produced a second green body, three of which are shown in FIG. 6. The second green bodies shown in FIG. 6 are in the form of a test structure, but could be formed in any desired structure by using a suitable additive manufacturing protocol. The second green bodies shown in FIG. 6 were formed using layers (each having a thicknesses of approximately 15 micron) and had a height of 10 mm and a bulk volume of 2.3 $cm^3$ with a volume of $UO_2$ material of 0.92 $cm^3$. However, Nuclear Fuel Slurry M did not produce a satisfactory green body because the amount and type of monomer resin (i.e., 36.7 vol. % SR 238) did not provide sufficient mechanical strength to facilitate the layer-by-layer building process. The layers prepared using Nuclear Fuel Slurry M exhibited brittle fractures and were only half adhering. From the results using Nuclear Fuel Slurry M and Nuclear Fuel Slurry N, it was concluded that the mixture of SR 238 and SR 494 for the monomer resin in Nuclear Fuel Slurry N promoted improved adhesion between layers (as compared to the monomer in Nuclear Fuel Slurry N) and contributed to improved mechanical properties of the cured layer.

The various embodiments disclosed herein have utilized uranium-based material as the fissile component. However, it should be understood that other fissile material can be used as a substitute for or in combination with uranium, including plutonium, thorium, americium, curium, neptunium, and combinations thereof.

Although described in connection with additive manufacturing components of a nuclear reactor, the additive manufacturing methods and in-situ inspection methods disclosed herein can be applied to the manufacture of other technologies, including in the petro-chemical industries (for example, for chemical reaction vessels), in the aerospace industry (for example, for parts of turbines including turbine blades and housings, and for parts for missiles and rockets including combustion chambers, nozzles, valves, and coolant piping) as well as can be adapted to other complex articles of manufacture. Additionally, the use of surrogate slurries to develop an additive manufacturing protocol which is then used with a non-surrogate slurry can be applied to the manufacture of other technologies, including those already noted such as in the petro-chemical industries and in the aerospace industry.

While reference has been made to specific embodiments, it is apparent that other embodiments and variations can be devised by others skilled in the art without departing from

TABLE 4

ADDITIONAL EXAMPLES OF NUCLEAR FUEL SLURRIES

| Slurry Component | Nuclear Fuel Slurry M | | Nuclear Fuel Slurry N | |
| --- | --- | --- | --- | --- |
| Monomer Resin | SR 238 (Hexane Diol Di-acrylate) | 36.7 vol. % | SR 238 (Hexane Diol Di-acrylate) | 26 vol. % |
|  |  |  | SR 494 (Ethoxylated Pentaerythritol tetraacrylate) | 21 vol. % |
| Particle of Uranium-containing Material | $UO_2$ | 55 vol. % | $UO_2$ | 38 vol. % |
| Dispersant | CC42 (Polypropoxy Quaternary ammonium chloride) | 3 vol. % | CC42 (Polypropoxy Quaternary ammonium chloride) | 0.8 vol. % |
| Photoactivated Dye | — |  | — |  |
| Photoabsorber | Tinuvin 477 (2-hydroxyphenyl-s-triazine with 18-20% 2-methoxy-1-propyl-acetate) | 0.2 vol. % | — |  |
| Photoinitiator | O819 (Bis(2,4,6-trimethylbenzoyl)-phenylphosphineoxide) | 0.4 vol. % | O819 (Bis(2,4,6-trimethylbenzoyl)-phenylphosphineoxide) | 0.2 vol. % |
| Diluent | Poly Ethylene Glycol | 4.7 vol. % | PRO14388 | 14 vol. % |

What is claimed is:

1. A slurry for additive manufacturing having a composition, comprising (in vol. % relative to total volume of the slurry):

| | |
|---|---|
| a monomer resin | 30 vol. % to 45 vol. %; |
| a plurality of surrogate particles | 30 vol. % to 70 vol. %; |
| a dispersant | >0 vol. % to 7 vol. %; |
| a photoactivated dye | greater than 0 vol. %; |
| a photoabsorber | greater than 0 vol. %; |
| a photoinitiator | greater than 0 vol. %; and |
| a diluent | 0 vol. % to 18 vol. % as a balance, | wherein the particles have a composition including a uranium-containing material, and
wherein the uranium-containing material is uranium carbide, uranium oxycarbide, uranium nitride, or uranium silicide.

2. The slurry for additive manufacturing according to claim 1, wherein the plurality of particles has a D50 particle size of 40 nm to 10 μm.

3. The slurry for additive manufacturing according to claim 1, wherein the monomer resin is an acrylate-based monomer resin or a methacrylate-based monomer or mixtures thereof.

4. The slurry for additive manufacturing as in claim 3, wherein the monomer resin is at least 50% acrylate-based.

5. The slurry for additive manufacturing as in claim 3, wherein the monomer resin is 70 to 90% acrylate-based.

6. The slurry for additive manufacturing according to claim 3, wherein the acrylate-based monomer resin is monofunctional, di-functional, tri-functional or tetra-functional or mixture thereof.

7. The slurry for additive manufacturing according to claim 6, wherein the acrylate-based monomer resin is at least 50% di-functional.

8. The slurry for additive manufacturing according to claim 7, wherein the acrylate-based monomer resin is at least 80% di-functional.

9. The slurry for additive manufacturing according to claim 7, wherein the acrylate-based monomer resin is 70-90% di-functional.

10. The slurry for additive manufacturing according to claim 1, wherein the photoactivated dye is a triarylmethane dye, the photoabsorber is a triazine-based photoabsorber, and the photoinitiator is a Type I or Type II photoinitiator.

11. The slurry for additive manufacturing according to claim 1, wherein the diluent is inert.

12. The slurry for additive manufacturing according to claim 1, wherein the diluent is methylnaphthalene.

13. The slurry for additive manufacturing according to claim 1, wherein the composition is curable by photoinitiation.

14. The slurry for additive manufacturing according to claim 1, wherein the photoactivated dye is $C_{25}H_{30}ClN_3$, the photoabsorber is 2-hydroxyphenyl-s-triazine with 18-20% 2-methoxy-1-propyl-acetate, and the photoinitiator is Bis(2, 4,6-trimethylbenzoyl)-phenylphosphineoxide.

15. The slurry for additive manufacturing according to claim 1, wherein the plurality of particles has a D50 particle size of 40 nm to 10 μm,
wherein the monomer resin is an acrylate-based monomer resin or a methacrylate-based monomer or mixtures thereof,
wherein the photoactivated dye is a triarylmethane dye,
wherein the photoabsorber is a triazine-based photoabsorber,
wherein the photoinitiator is a Type I or Type II photoinitiator, and
wherein the diluent is methylnaphthalene.

16. A method for manufacturing a component of a nuclear reactor system, the method comprising:
forming a green body of a component of a nuclear reactor system from the slurry for additive manufacturing according to claim 1, wherein the forming uses an additive manufacturing protocol.

17. The method according to claim 16, further comprising sintering the green body to form the component of the nuclear reactor system.

18. A slurry for additive manufacturing having a composition, comprising (in vol. % relative to total volume of the slurry):

| | |
|---|---|
| a monomer resin | 30 vol. % to 45 vol. %; |
| a plurality of particles | 30 vol. % to 70 vol. %; |
| a dispersant | >0 vol. % to 7 vol. %; |
| a photoactivated dye | greater than 0 vol. %; |
| a photoabsorber | greater than 0 vol. %; |
| a photoinitiator | greater than 0 vol. %; and |
| a diluent | 0 vol. % to 18 vol. % as a balance, | wherein the particles have a composition including a uranium-containing material, and
wherein the uranium-containing material is a cermet of uranium oxide and tungsten, a cermet of uranium dioxide and tungsten, a cermet of uranium oxide and molybdenum, or a cermet of uranium dioxide and molybdenum.

19. The slurry for additive manufacturing according to claim 18, wherein the plurality of particles has a D50 particle size of 40 nm to 10 μm.

20. The slurry for additive manufacturing according to claim 18, wherein the monomer resin is an acrylate-based monomer resin or a methacrylate-based monomer or mixtures thereof.

21. The slurry for additive manufacturing as in claim 20, wherein the monomer resin is at least 50% acrylate-based.

22. The slurry for additive manufacturing as in claim 20, wherein the monomer resin is 70 to 90% acrylate-based.

23. The slurry for additive manufacturing according to claim 20, wherein the acrylate-based monomer resin is mono-functional, di-functional, tri-functional or tetra-functional or mixture thereof.

24. The slurry for additive manufacturing according to claim 23, wherein the acrylate-based monomer resin is at least 50% di-functional.

25. The slurry for additive manufacturing according to claim 24, wherein the acrylate-based monomer resin is at least 80% di-functional.

26. The slurry for additive manufacturing according to claim 24, wherein the acrylate-based monomer resin is 70-90% di-functional.

27. The slurry for additive manufacturing according to claim 18, wherein the photoactivated dye is a triarylmethane dye, the photoabsorber is a triazine-based photoabsorber, and the photoinitiator is a Type I or Type II photoinitiator.

28. The slurry for additive manufacturing according to claim 18, wherein the diluent is inert.

29. The slurry for additive manufacturing according to claim 18, wherein the diluent is methylnaphthalene.

30. The slurry for additive manufacturing according to claim 18, wherein the composition is curable by photoinitiation.

31. The slurry for additive manufacturing according to claim 18, wherein the photoactivated dye is $C_{25}H_{30}ClN_3$, the photoabsorber is 2-hydroxyphenyl-s-triazine with 18-20% 2-methoxy-1-propyl-acetate, and the photoinitiator is Bis(2,4,6-trimethylbenzoyl)-phenylphosphineoxide.

32. The slurry for additive manufacturing according to claim 18, wherein the plurality of particles has a D50 particle size of 40 nm to 10 μm,
    wherein the monomer resin is an acrylate-based monomer resin or a methacrylate-based monomer or mixtures thereof,
    wherein the photoactivated dye is a triarylmethane dye,
    wherein the photoabsorber is a triazine-based photoabsorber,
    wherein the photoinitiator is a Type I or Type II photoinitiator, and
    wherein the diluent is methylnaphthalene.

33. A method for manufacturing a component of a nuclear reactor system, the method comprising:
    forming a green body of a component of a nuclear reactor system from the slurry for additive manufacturing according to claim 18, wherein the forming uses an additive manufacturing protocol.

34. The method according to claim 33, further comprising sintering the green body to form the component of the nuclear reactor system.

\* \* \* \* \*